J. W. & J. CADE.
FERTILIZER DISTRIBUTER.
APPLICATION FILED JUNE 28, 1916.

1,224,520.

Patented May 1, 1917.

Witness
Chas. L. Gresbauer.

Inventors
J. W. Cade
Jack Cade
By Davis & Davis
Attorneys

UNITED STATES PATENT OFFICE.

JAMES W. CADE AND JACK CADE, OF MOUNT CARMEL, SOUTH CAROLINA.

FERTILIZER-DISTRIBUTER.

1,224,520.			Specification of Letters Patent.		Patented May 1, 1917.

Application filed June 28, 1916.   Serial No. 106,327.

*To all whom it may concern:*

Be it known that we, JAMES W. CADE and JACK CADE, citizens of the United States of America, and residents of Mount Carmel, county of Abbeville, State of South Carolina, have invented certain new and useful Improvements in Fertilizer-Distributers, of which the following is a full and clear specification.

This invention relates to improvements in fertilizer distributers and the objects of our improvements are the provision of a simple and inexpensive device for efficiently discharging barnyard and stable manure and similar coarse or wet fertilizers into furrows or alongside of rows of cotton, corn or other growing plants, even after such plants have attained considerable height.

We attain these objects by the mechanism illustrated in the accompanying drawing, in which—

Figure 1:
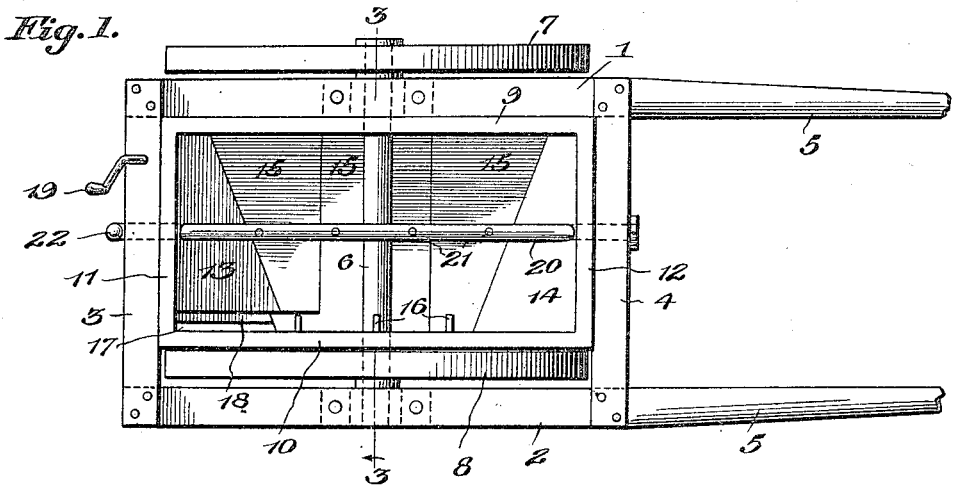
Figure 2:
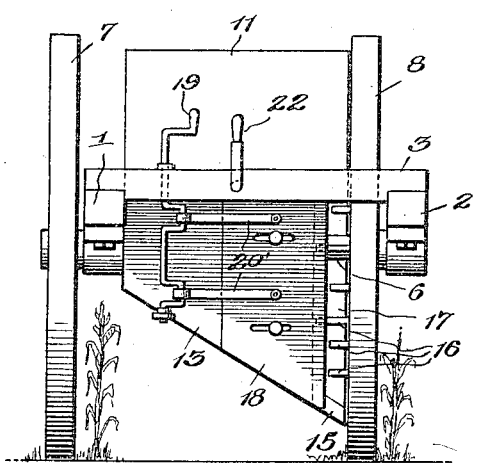
Figure 3:
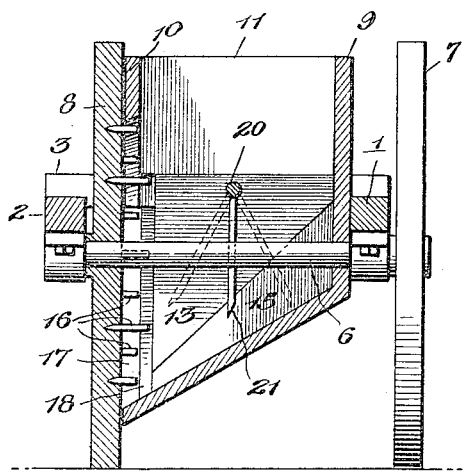

Figure 1 is a plan view of our apparatus;

Fig. 2, an end elevation showing the rear end of the distributer; and Fig. 3, a vertical section on the line 3—3, Fig. 1.

The frame of our improved fertilizer distributer comprises a pair of side bars 1 and 2 and cross-bars 3 and 4, and the front end of this frame is provided with suitable draft appliances, such as thills 5. Journaled in suitable bearings carried by the side bars is an axle 6 to which draft wheels 7 and 8 are secured. The wheel 8 is imperforate and is secured to the axle at a point inside the frame adjacent to the side bar 2.

Supported in the frame is a hopper body comprising vertical side walls 9 and 10 and vertical end walls 11 and 12. The side wall 10 is flush with the inner face of the imperforate wheel 8 and its lower edge is cut away so as to expose practically the entire inner face of the wheel 8, as shown in Fig. 3. The lower edges of the end walls 11 and 12 are substantially in alinement with the frame bars 3 and 4. The bottom of the hopper comprises end plates 13 and 14 inclined downwardly and inwardly toward the axle, and bottom plates 15 inclined downwardly from the lower edge of side wall 9 and sidewise to the inner face of wheel 8 at a point near the ground, thus forming a hopper bottom adapted to deliver the contents of the hopper against the exposed inner face of the imperforate wheel 8. The inner face of wheel 8 is provided with a series of disintegrating and feeding fingers or pins 16 projecting into the open side of the hopper, which, when the wheel rotates as the machine moves forwardly, will force the fertilizer rearwardly through a discharge opening 17 formed in the inclined rear plate 13 of the hopper bottom along the inner face of wheel 8. This discharge opening is adapted to be closed, or partially closed, by a sliding gate 18 slidably mounted on end plate 13 and operated by suitable mechanism, such as crank arm 19 and pitmen 20'.

Suitable means are provided for positively forcing the coarse or wet material into contact with the pins 16 from time to time, if necessary, such means preferably embodying a rock shaft 20 extending longitudinally through the hopper and journaled in the cross-bars 3 and 4 of the frame. This shaft is provided with depending prongs or fingers 21 and with an operating handle 22 at the rear of the machine.

It will be observed that we have provided a simple and inexpensive apparatus adapted to discharge stable, barnyard or other coarse or wet fertilizer without danger of clogging and that with a machine constructed as above described the fertilizer may be discharged at a point close to the ground and closely adjacent to rows of growing plants, even after the plants have grown to considerable size, without danger of breaking down the plants by contact with the hopper or other parts of the machine.

It will be further observed that with a machine constructed as described, the discharge of fertilizer may be readily controlled during the operation of the apparatus and that the discharge may be readily cut off, when desired, to prevent waste when the machine is standing or being moved along at points where it is not desired to distribute fertilizer.

Having thus described our invention, what we claim is:

1. In a fertilizer distributer, a frame embodying side bars and cross-bars; an axle carried thereby; a pair of draft wheels secured to said axle, one of said wheels being imperforate and mounted on the axle inside the frame adjacent to one of said side bars; a hopper body mounted between the sides of the frame and the imperforate draft wheel and having a bottom inclined downwardly and sidewise toward the imperforate draft wheel, said hopper body being provided with a vertical side wall lying closely adjacent to said imperforate wheel and provided with an opening closed thereby, said hopper being provided also with a discharge opening in its rear wall adjacent to said wheel; an adjustable gate for said discharge opening; and a series of fingers carried by the imperforate draft wheel and projecting into the hopper body through said side opening.

2. In a fertilizer distributer, a frame embodying side bars and cross-bars; an axle carried thereby; a pair of draft wheels secured to said axle, one of said wheels being imperforate and mounted on the axle inside the frame adjacent to one of said side bars; a hopper body mounted between the sides of the frame and the imperforate draft wheel and having a bottom inclined downwardly and sidewise toward the imperforate draft wheel, said hopper body being provided with a vertical side wall lying closely adjacent to said imperforate wheel and provided with an opening closed thereby, said hopper being provided also with a discharge opening in its rear wall adjacent to said wheel; and a series of fingers carried by the imperforate draft wheel and projecting into the hopper body through said side opening.

3. In a fertilizer distributer, a frame embodying side bars and cross-bars; an axle carried thereby; a pair of draft wheels secured to said axle, one of said wheels being imperforate and mounted on the axle inside the frame adjacent to one of said side bars; a hopper body mounted between the sides of the frame and the imperforate draft wheel and having a bottom inclined downwardly and sidewise toward the imperforate draft wheel, said hopper body being provided with an opening in its side wall adjacent to the imperforate wheel and closed thereby and a discharge opening in its rear wall adjacent to said wheel; a series of fingers carried by the imperforate draft wheel and projecting into the hopper body through said side opening; and means for forcing the contents of the hopper into contact with said fingers.

4. In a fertilizer distributer, the combination of a frame, an axle journaled therein; a pair of draft wheels on said axle, one of which is an imperforate disk having a series of pins on its inner face; a hopper carried by said frame having a rear discharge opening adjacent to the inner face of the imperforate wheel, said hopper having an opening in one side thereof closed by said imperforate draft wheel and an inclined bottom adapted to deliver the contents of the hopper against said wheel at a point near the ground; a rock shaft extending longitudinally through said hopper and provided with depending fingers adapted to force the contents of the hopper against the imperforate wheel; and means for varying the size of the discharge opening, embodying a closure plate slidably mounted on the rear wall of the hopper and a crank and pitman for operating said plate.

In testimony whereof we hereunto affix our signatures this 26th day of June, 1916.

JAMES W. CADE.
JACK CADE.

Copies of this patent may be obtained for five cents each, by addressing the "Commissioner of Patents Washington, D. C."